April 16, 1968     D. S. ADAMS ET AL     3,377,998

SPARK IGNITION SYSTEMS

Filed Oct. 29, 1965     4 Sheets-Sheet 1

April 16, 1968  D. S. ADAMS ETAL  3,377,998
SPARK IGNITION SYSTEMS

Filed Oct. 29, 1965  4 Sheets-Sheet 2

United States Patent Office 3,377,998
Patented Apr. 16, 1968

3,377,998
SPARK IGNITION SYSTEMS
Derek Stanley Adams, Acocks Green, Birmingham, and Brian Leslie Phillips, Handsworth, Birmingham, England, assignors to Joseph Lucas (Industries) Limited, Birmingham, England
Filed Oct. 29, 1965, Ser. No. 505,636
Claims priority, application Great Britain, Dec. 2, 1964, 48,946/64
12 Claims. (Cl. 123—148)

ABSTRACT OF THE DISCLOSURE

In a spark ignition system for an internal combustion engine, an inductor is connected in series with a switch across a battery. The switch is closed at periodic intervals by the engine, and when it closes energy is stored in the inductor, this energy later being used to produce a spark at a plug of the engine in timed relationship thereto. The series circuit of switch and inductor includes a current sensing device which turns the switch off when the current flowing in the series circuit reaches a predetermined value, so that the energy stored in the inductor each time the switch closes is constant.

Figure 1:
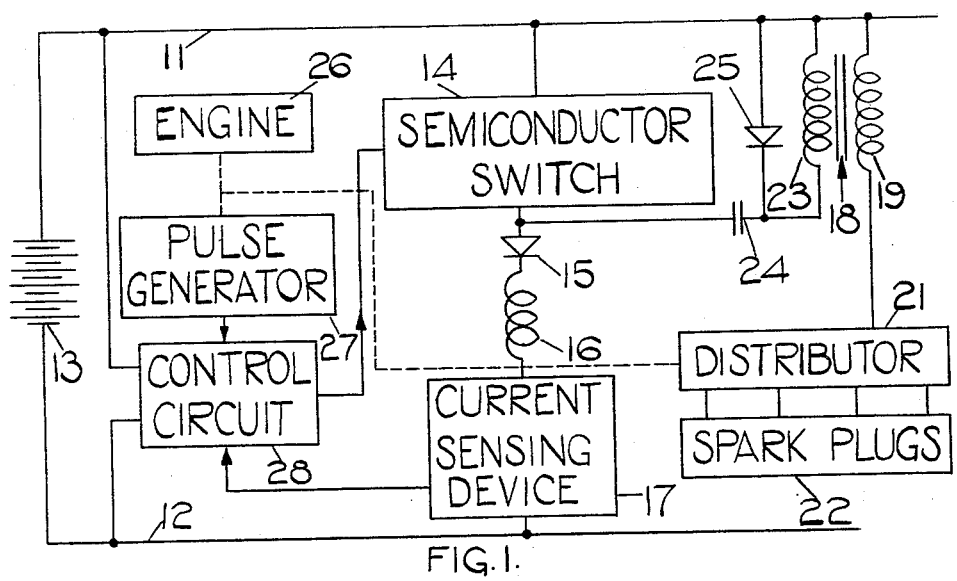

This invention relates to spark ignition systems for internal combustion engines.

In its broadest aspect, the invention resides in a spark ignition system in which energy derived from a battery is stored in an inductor and then used to produce a spark, the amount of energy stored being determined by a current sensing device which stops current from the battery to the inductor when the current flowing in the inductor reaches a predetermined value.

In its preferred form, the invention makes use of a semiconductor device known as a gate controlled switch. This device is similar to the semiconductor device called a controlled rectifier, but has the additional property that it can be switched off by a negative current flowing between its gate and cathode, whereas a conventional controlled rectifier can only be switched off by a reverse voltage between its anode and cathode. The gate controlled switch can handle currents of the same magnitude as the controlled rectifier, and should not be confused with devices such as the trigistor which operates in a similar manner, but can handle only very small anode-cathode currents. The gate controlled switch has been referred to in a number of our previous applications as a switchable rectifier, but the term "gate controlled switch" is now preferred and more generally used. The gate controlled switch is one example of a semiconductor switch, which term is hereby defined to mean a semiconductor device having a control terminal, and a pair of main terminals, signals applied to the control terminal determining whether or not the switch conducts. In the case of a gate controlled switch, the main terminals are the anode and cathode and the control terminal is the gate. If a transistor is used, the collector and emitter constitute the main terminals and the base the control terminal. It will be noted that the definition excludes, for example, a controlled rectifier, even though a controlled rectifier has the necessary three terminals, because although the gate signal applied to a controlled rectifier initiates conduction, turning off of the controlled rectifier can only be effected by reversing its anode-cathode voltage.

Bearing in mind the above definition, the invention in a narrower aspect resides in a spark igniton system including first and second terminals which in use are connected to a D.C. source, a series circuit connected between said terminals, said series circuit incorporating the main terminals of a semiconductor switch, the anode-cathode path of a diode, and an inductor, a capacitor connected in series with a winding across the main terminals of said semiconductor switch, means operable in timed relationship to the engine for applying signals to the control terminal of said semiconductor switch, at the instants when a spark is required, to turn said semiconductor switch on and permit said capacitor to discharge through said winding and the main terminals of said semiconductor switch means whereby in use discharge of the capacitor through said winding produces a spark, and means operable when the current flowing in said series circuit reaches a predetermined magnitude for altering the signal at the control terminal of said semiconductor switch so as to turn it off, the energy stored in said inductor when said semiconductor switch is on serving to charge said capacitor when said semiconductor switch is off.

In the accompanying drawings, FIGURE 1 is a circuit diagram illustrating a generalised example of the invention with several components in block form, and FIGURES 2 to 7 illustrate respectively five specific examples of the invention.

Referring to FIGURE 1, there are provided first and second supply lines 11, 12 which in use are connected to the battery 13 of a road vehicle so as to be positive and negative in polarity respectively. The lines 11, 12 are interconnected through a series circuit including the main terminals of a semiconductor switch 14, the anode and cathode of a diode 15, an inductor 16 and a current sensing device 17. There is further provided an ignition transformer 18 having a secondary winding 19 which is connected through a distributor 21 to the spark plugs 22 of the engine in turn, and a primary winding 23 one end of which is connected to the line 11 and the other end of which is connected to the anode of the diode 15 through a capacitor 24. The primary winding 23 is bridged by a diode 25 which by-passes the primary winding when the capacitor is being charged.

The engine is indicated at 26, and in addition to driving the distributor 21 it operates a pulse generator 27 which serves to supply pulses to a control circuit 28 at the instants when sparks are required. The control circuit, which derives its power from the battery as shown, receives a further input from the device 17, and provides output to the control terminal of the switch 14. The generator 27 may be magnetic, or may include an interrupter, but in any case is of known form and forms no parts of the present invention.

In operation, when the control circuit 28 receives a pulse from the generator 27, it assumes a state in which it supplies a signal to the switch 14 to turn the switch 14 on. The capacitor 24 has previously been charged, in a manner to be described, and now discharges through the primary winding 23 of the ignition transformer and the main terminals of the switch 14, so that a spark is produced at the appropriate plug. While the switch 14 is on, current flows through the inductor 16 and the current sensing device 17, and when the current flowing through the device 17 reaches a predetermined magnitude, a signal is fed from the device 17 to the control circuit 28 to cause the circuit 28 to assume an alternative state in which the signal applied to the control terminal of the switch 14 is altered so that the switch 14 is turned off. The energy stored in the inductor 16 now charges the capacitor 24, and the cycle is repeated when a further pulse is received by the control circuit 28.

The arrangement described has the great advantage that the energy stored in the inductor 16 is substantially constant and independent of engine speed and battery voltage. The circuit would not of course, operate if the battery voltage were to fall close to zero, but even for very low battery voltages there is sufficient time between sparks for the current in the inductor 16 to build up to the level determined by the device 17. This advantage would not be achieved if the switch 14 were turned off as well as on by the engine, because in this case the time for which the current could build up in the inductor would vary with engine speed, and the energy stored would vary with engine speed and battery voltage. The advantage achieved by the invention results essentially from the use of the device 17, but can be enhanced by further optional refinements now to be described.

Figure 2:
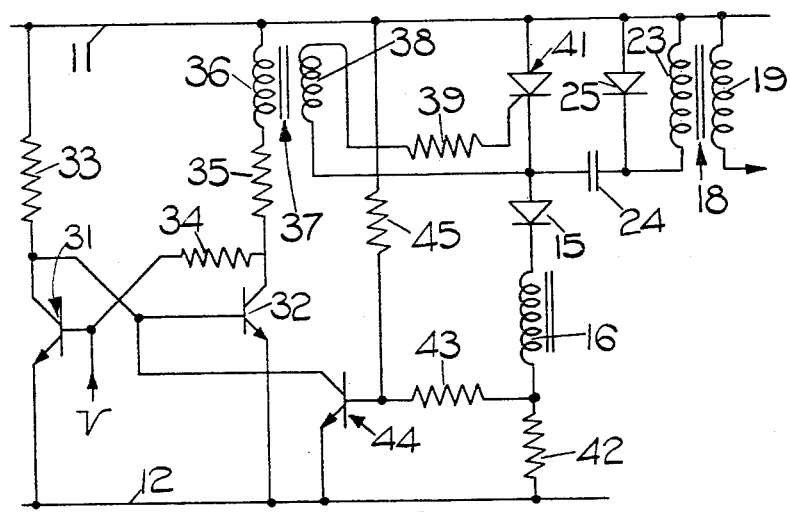

Referring now to FIGURE 2, the control circuit includes first and second n-p-n transistors 31, 32 having their emitters connected to the line 12. The collector of the transistor 31 is connected to the line 11 through a resistor 33 and is also connected to the base of the transistor 32. The collector of the transistor 32 is connected to the base of the transistor 31 through a resistor 34, and is connected to the line 11 through a resistor 35 in series with the primary winding 36 of a transformer 37. The secondary winding 38 of the transformer 37 has one end connected through a resistor 39 to the gate of a gate controlled switch 41 constituting the switch 14, and its other end connected to the cathode of the switch 41.

The current sensing device 17 is in the form of a resistor 42 and a point intermediate the resistor 42 and inductor 16 is connected through a resistor 43 to the base of an n-p-n transistor 44, this base also being connected through a resistor 45 to the line 11. The transistor 44 has its emitter connected to the line 12, and its collector connected to the base of the transistor 32.

The pulses received by the control circuit can be in the form of negative pulses applied to the base of the transistor 31 or positive pulses applied to the base of the transistor 32. In either case, when a pulse is received, the bistable circuit including the transistors 31, 32 assumes a state in which the transistor 32 conducts, and current flows through the resistor 35 and the primary winding 36 to cause a signal to be applied between the gate and cathode of the gate controlled switch 41 to turn it on. When the predetermined current is reached, the voltage across the resistor 42 is sufficient to cause the transistor 44 to conduct, and as soon as the transistor 44 conducts, the base of the transistor 32 is connected to the negative line 12, and so that bistable circuit assumes its original condition in which the transistor 31 is conducting. When the bistable circuit reverts to its original condition, a further pulse of the opposite polarity is produced in the transformer 37, and switches the gate controlled switch 41 off.

It will be appreciated that the bistable circuit switches when the transistor 44 draws sufficient current from the base of the transistor 32 to take the transistor 32 out of saturation. The current which must be drawn by the third transistor varies with battery voltage, and the resistors 43, 45 in this example provide compensation for changes in supply voltage by ensuring that when the current through the resistor 42 reaches the predetermined magnitude, the transistor 44 will draw sufficient current from the base of the transistor 32 to switch the bistable circuit. Without the resistors 43, 45 there would be some change in the peak current through the inductor 16 with variations in the supply voltage, it being understood that the peak current through the inductor is determined by the instant at which the bistable circuit reverts to its original condition.

Figure 3:
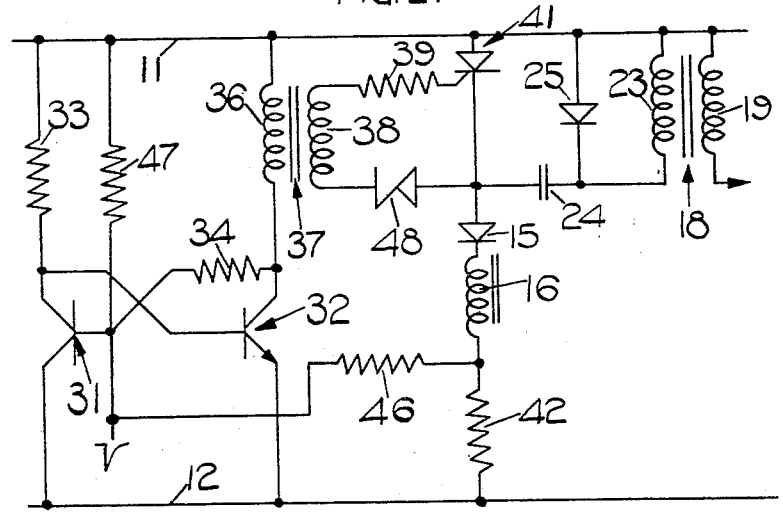

In the modification shown in FIGURE 3, the resistors 35, 43, 45 and the transistor 44 are omitted, and a point intermediate the resistor 42 and inductor 16 is connected through resistors 46, 47 in series to the line 11, a point intermediate the resistors 46, 47 being connected to the base of the transistor 31. The collector of the transistor 32 is connected directly to the line 11 through the primary winding 36.

The resistors 46, 47 in this modification serve the same purpose as the resistors 43, 45 in FIGURE 2, and the circuit operates in the same way even though the transistor 44 is omitted. It will be appreciated that in this case when the predetermined current is reached the base of the transistor 31 is made positive so that the transistor 31 tends to conduct as distinct from the previous example in which the base of the transistor 32 was held negative so that it did not conduct. The omission of the resistor 35 in this case is permissible as long as the inductance of the primary winding 36 is chosen so that the inductive rise of current in this primary winding gives the required turn-off current through the gate and cathode of the gate controlled switch 41 at the instant when the current flowing through the inductor 16 reaches the predetermined value. This is done by making the inductance of the primary winding 36 high with respect to its resistance, and similarly making the inductance of the inductor 16 high with respect to its resistance, so that the currents flowing in these two components increase substantially linearly. The conditions explained are then fulfilled, so rendering the turn-off current substantially independent of supply voltage. However, in practice the values of inductance required to fulfill this condition would result in excessive energy being stored in the transformer 37, and in order to overcome this difficulty the additional energy must be dissipated as quickly as possible after the gate controlled switch 41 is turned off. This can conveniently be done by inserting a Zener diode 48 between the cathode of the gate controlled switch and the secondary winding 38. Alternatively, instead of a Zener diode a resistor could be used, the resistor being bridged by a diode having its anode connected to the cathode of the gate controlled switch 41 and its cathode connected to the secondary winding 38. It will be appreciated that the diode conducts the current for switching the gate controlled switch on.

The resistor 39 is included to limit the gate current applied to the gate controlled switch 41 to turn it on. This current will vary with supply voltage, but in a modification designed to provide a constant current for switching the gate controlled switch on independently of the supply voltage, the resistor 39 is omitted so that one end of the secondary winding 38 is connected directly to the gate of the gate controlled switch 41 and the other end of the secondary winding 38 is connected to the cathode of the gate controlled switch through a constant current device which has a reverse characteristic such that adequate turn-off current can be applied to the gate, and the excess energy in the transformer 37 can be dissipated after the gate controlled switch 41 is turned off. Alternatively, if the constant current device does not have these characteristics, other devices can be incorporated to provide the necessary characteristics.

Figure 4:
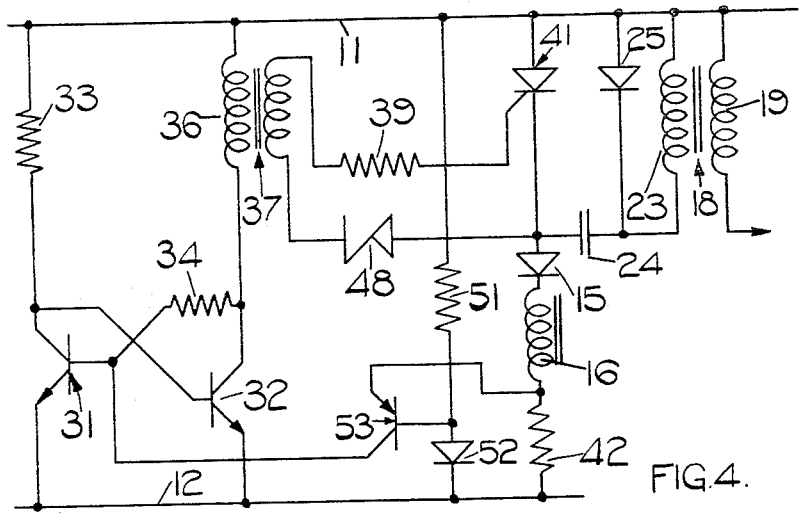

In a further modification shown in FIGURE 4, instead of using the resistors 46, 47 a resistor 51 is connected in series with the anode-cathode path of a diode 52 between the lines 11, 12. A point intermediate the resistor 51 and diode 52 is connected to the base of a p-n-p transistor 53, the emitter of which is connected to a point intermediate the inductor 16 and resistor 42, and the collector of which is connected to the base of the transistor 31. This arrangement gives more precise control of the peak current in the inductor 16.

In a further modification of FIGURE 3, the resistor 47 is omitted, and the resistor 33 is replaced by a constant current device.

Figure 5:
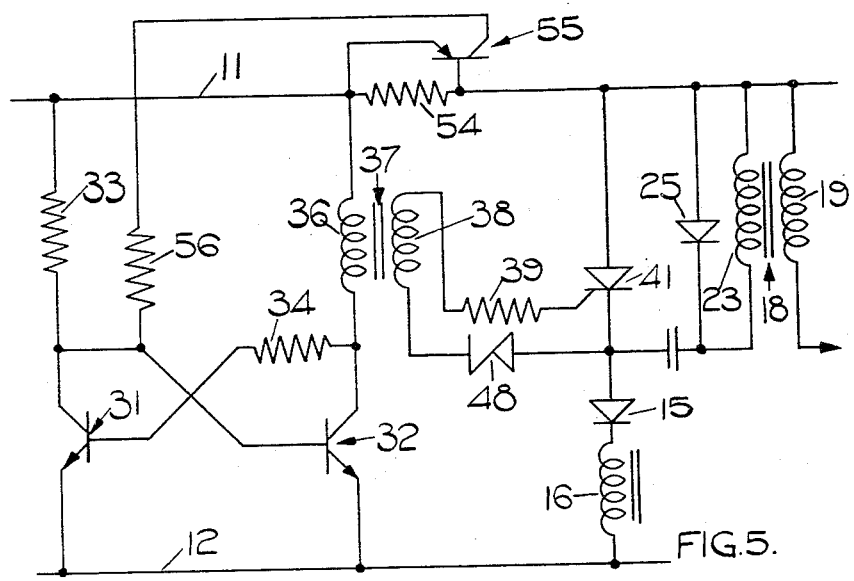

FIGURE 5 shows an example which in operation is very similar to FIGURE 3, although the physical arrangement has the marked difference that the device 17 is in the form of a resistor 54 in the anode circuit of the switch 41, the components 25, 23, 19 being connected to the line 11 through the resistor 54. In this respect, FIGURE 5 also differs from the generalised circuit shown in FIGURE 1, and it is important to note that with suitable circuit modifications the device 17 can be anywhere in the series circuit defined by components 14, 15, 16.

Compared with FIGURE 3, FIGURE 5 has the resistors 42, 46, 47 omitted. In addition to the resistor 54, the circuit now includes a p-n-p transistor 55 having its base connected to the anode of the switch 41, its emitter connected to the line 11 and its collector connected through a resistor 56 to the base of the transistor 32. The circuit operates in substantially the same way as FIGURE 3.

Figure 6:
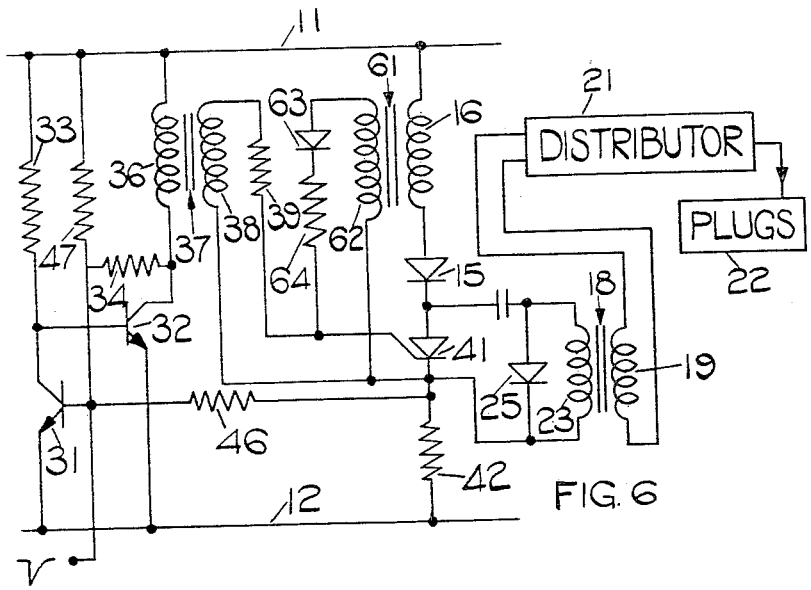

FIGURE 6 illustrates a further development of FIGURE 3 in which the Zener diode 48 is omitted and the diode 15 and inductor 16 are positioned in the anode circuit of the switch 41. The inductor 16 now constitutes the primary winding of a feedback transformer 61, the secondary winding 62 of which has one end connected to the cathode of the switch 41 and its other end connected to the gate of the switch 41 through the anode-cathode path of a diode 63 and a resistor 64 in series. In this arrangement, the transformer 37 need only supply sufficient forward current to the switch 41 to initiate turn-on, because once the switch 41 starts to turn on, additional forward drive is supplied by feedback from the transformer 61.

In order that the circuit operates independently of temperature variations, the resistor 46 is chosen to have a suitable negative temperature coefficient. Alternatively the same requirement can be met by a resistor 47 with a suitable positive coefficient, and instead of, or as well as, these two possibilities, the resistor 42 can have a negative coefficient.

Figure 7:
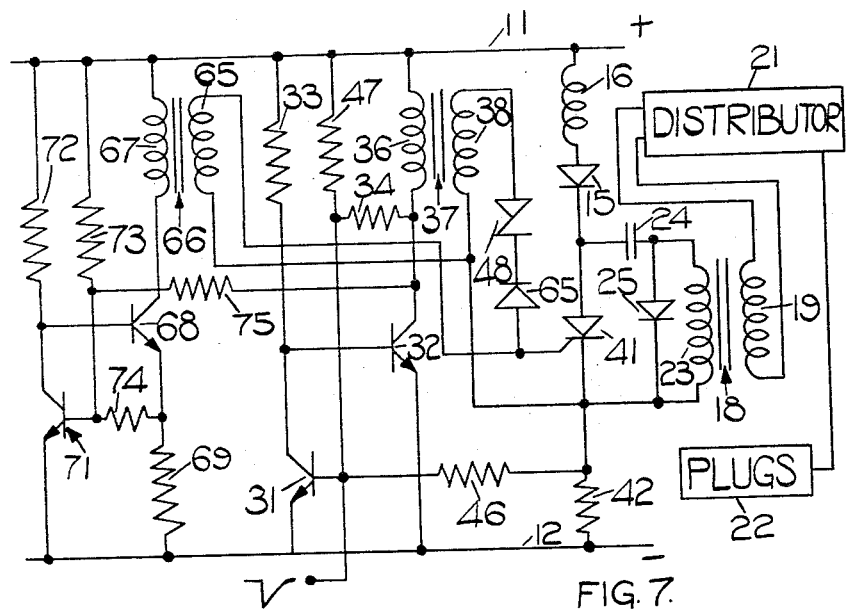

Referring now to FIGURE 7, part of the circuit is smilar to FIGURE 3 except that the diode 15 and inductor 16 are positioned in the anode circuit of the switch 41, the resistor 39 is replaced by a diode 65, and the Zener diode 48 is connected in series with the diode 65. In addition, the gate and cathode of the switch 41 are connected to opposite ends of the secondary winding 65 of a transformer 66 having one end of its primary winding 67 connected to the line 11, and its other end connected to the collector of a transistor 68, the emitter of which is connected to the line 12 through a resistor 69 and the base of which is connected to the collector of a transistor 71. The transistor 71 has its collector connected to the line 11 through a resistor 72, its emitter connected to the line 12, and its base connected through a resistor 73 to the line 11, through a resistor 74 to the emitter of the transistor 68, and through a resistor 75 to the collector of the transistor 32.

FIGURE 7 is designed to operate reliably at exceptionally low battery voltages, and in fact will operate even if the voltage of a nominal fifteen volt supply falls to three volts. The circuit of FIGURE 3 could be made to operate at such low voltages, but at high supply voltage the forward drive applied to the gate of switch 41 would become excessive. However, the additional components overcome this difficulty because when transistor 32 is on the circuit including transistors 68 and 71 operates to cause a constant current pulse to flow in the winding 67, giving a substantially constant forward drive to the switch 41 independent of battery voltage.

When transistor 31 is turned on, transistor 32 is turned off, so turning transistors 71 and 68 on and off respectively. By this process, the forward drive provided by transformer 66 is removed and turn off of switch 41 is provided by transformer 37 as before. The diode 65 blocks current flow from the winding 38 to the switch 41 when the transistor 32 is turned on.

The temperature sensitive resistors can also be incorporated in FIGURE 7. In another modification, the bistable circuit incorporating the transistors 31, 32 is modified by connecting one end of each of resistors 33, 47 to the line 11 through an additional resistor, and connecting a point intermediate the additional resistor and the resistors 43, 47 to the line 12 through a Zener diode. With this arrangement, the voltage required across the resistors 42 to turn on the transistors 31 can be reduced, so that the circuit can be used at even lower battery voltages.

As previously explained, a transistor can be used in place of a gate controlled switch, it then being necessary to ensure that the transistor remains saturated while it is on. This can be done by ensuring that the control circuit 28 (FIG. 1) provides sufficient base current to saturate the transistor, or by incorporating a transformer as in FIGURE 6 to increase the base drive with increasing collector-emitter current. In FIGURES 2 to 7 current is provided to turn off the gate controlled switch, and it will be understood that where a transistor is used the removal of the drive current is sufficient to stop the transistor conducting. However, the use of circuits such as described in FIGURES 2 to 7 is advantageous even with a transistor, because the reverse base-emitter bias ensures that the transistor switches off rapidly.

Having thus described our invention what we claim as new and desire to secure by Letters Patent is:

1. A spark ignition system for an internal combustion engine, comprising a D.C. source, a semiconductor switch, said semiconductor switch having a control terminal, and a pair of main terminals, signals applied to the control teminal determining whether or not the switch conducts current between said pair of main terminals, a series circuit connected across said D.C. source, said series circuit incorporating the main terminals of said semiconductor switch, the anode-cathode path of a diode, and an inductor, a capacitor in series with a winding across the main terminals of said semiconductor switch, means operable in timed relationship to the engine for applying signals to the control terminal of said semiconductor switch, at the instants when a spark is required, to turn said semiconductor switch on and permit said capacitor to discharge through said winding and the main terminals of said semiconductor switch, means whereby in use discharge of the capacitor through said winding produces a spark, current sensing means in said series circuit, and means operable by said current sensing means when the current flowing in said series circuit reaches a predetermined magnitude for altering the signal at the control terminal of said semiconductor switch so as to turn it off, the energy stored in said inductor when said semiconductor switch is on serving to charge said capacitor when said semiconductor switch is off.

2. A spark ignition system as claimed in claim 1 in which said means operable in timed relationship to the engine comprises a bistable control circuit which is driven from a first state to a second state by pulses received from the engine, and when in its second state turns the semiconductor switch on, the bistable circuit being driven back to its first state when the current flowing in said series circuit reaches the predetermined magnitude, and when reverting to said first state serving to turn the semiconductor switch off.

3. A spark ignition system as claimed in claim 2 in which the control circuit applies signals to the control terminal of the semiconductor switch by way of a transformer the primary winding of which is connected to the control circuit and the secondary winding of which is connected to the control terminal of the semiconductor switch.

4. A spark ignition system as claimed in claim 3 in which both the inductor and the primary winding of the transformer have high inductance to resistance ratios, so that the currents flowing therethrough increase substantially linearly.

5. A spark ignition system as claimed in claim 4 including means for dissipating excess energy stored in the transformer after the semiconductor switch is turned off.

6. A spark ignition system as claimed in claim 2 including a resistor in series with said control terminal for limiting the current applied to the control terminal.

7. A spark ignition system as claimed in claim 1 including a constant current device connected to said control terminal and rendering the current applied to the control terminal independent of battery voltage.

8. A spark ignition system as claimed in claim 1 in which the inductor constitutes the primary winding of a feedback transformer the secondary winding of which is connected to the control terminal of the semiconductor switch to provide feedback thereto.

9. A spark ignition system as claimed in claim 1 in which said means operable in timed relationship to the engine comprises a bistable control circuit which is driven from a first state to a second state by pulses received from the engine, the bistable circuit being driven back to its first state when the current flowing in said series circuit reaches the predetermined magnitude, and when reverting to said first state serving to turn the semiconductor switch off, turning on of the semiconductor switch being controlled by a forward drive circuit operation of which is in turn controlled by the bistable circuit, the forward drive circuit supplying signals to the control electrode through a further transformer.

10. A spark ignition system as claimed in claim 1 in which the semiconductor switch is a gate controlled switch.

11. A spark ignition system as claimed in claim 1 in which the semiconductor switch is a transistor.

12. A spark ignition system as claimed in claim 1 including resistors connected in the system and which render operation of the system substantially independent of temperature variations.

References Cited
UNITED STATES PATENTS

| | | | |
|---|---|---|---|
| 3,263,124 | 7/1966 | Stuermer | 315—212 |
| 3,271,593 | 9/1966 | Vilbiss | 307—88.5 |
| 3,302,629 | 2/1967 | Shano | 123—148 |
| 3,312,211 | 4/1967 | Boyer | 123—148 |

LAURENCE M. GOODRIDGE, *Primary Examiner.*